United States Patent [19]

Tomasi

[11] 4,302,758
[45] Nov. 24, 1981

[54] RADAR SYSTEM FOR DETERMINING RANGE AND SPEED OF AN OBJECT

[75] Inventor: Jean-Pierre Tomasi, Velizy, France

[73] Assignee: U.S. Philips Corporation, New York, N.Y.

[21] Appl. No.: 93,334

[22] Filed: Nov. 13, 1979

[30] Foreign Application Priority Data

Jan. 12, 1978 [FR] France ............................. 78 33976

[51] Int. Cl.³ ............................................. G01S 13/32
[52] U.S. Cl. ...................................... 343/9 R; 343/14
[58] Field of Search ................................. 343/9 R, 14

[56] References Cited

U.S. PATENT DOCUMENTS

3,634,860  1/1972  Rittenbach .......................... 343/9 R
4,232,315  11/1980  Kern ............................. 343/9 R X

*Primary Examiner*—T. H. Tubbesing
*Attorney, Agent, or Firm*—Thomas A. Briody; David R. Treacy; Robert J. Kraus

[57] ABSTRACT

A system for determining the range H to an object and the relative velocity v of the object, including means for generating first and second high-frequency signals, transmitting, receiving and mixing the received high-frequency signal with the high-frequency signal transmitted for generating first and second beat signals, and an arithmetic unit determining in an iterative manner from the point at which one of the two beat frequencies has the lowest value, the value of H and the value of v.

5 Claims, 9 Drawing Figures

RADAR SYSTEM FOR DETERMINING RANGE AND SPEED OF AN OBJECT

The invention relates to a system for determining the range H to an object and the relative velocity v of the object, comprising, means for generating a first high-frequency signal having a time-variable frequency $F_2(t)$ representing a FM-modulated version of a first high-frequency carrier signal having the carrier frequency $F_{01}$;

means for transmitting this first high-frequency signal towards the object;

means for receiving the first high-frequency signal reflected from the object;

means for mixing the received first high-frequency signal with the first high-frequency signal to be transmitted for generating a first beat signal having a first beat frequency $f_{b1}$ which is defined by a first mathematical expression $$f_{b1} = 2\frac{H}{c} \frac{dF_1(t)}{dt} \frac{1}{\cos\alpha} - 2\frac{F_{01}}{c} v \sin\alpha$$

wherein c represents the speed of light, $$\frac{dF_1(t)}{dt}$$

the variation in the frequency of the first high-frequency signal and $\alpha$ the angle at which a point of the object is seen.

Such a system finds numerous applications, particularly in air traffic. The system furnishes information, when an aircraft prepares for landing, about the altitude as well as about the horizontal speed, it being particularly useful to have this last-mentioned information as it enables the determination of the velocity of the wind, knowledge about this velocity of the wind increasing the safety on landing.

A system of this type is described in the United Kingdom Pat. No. 671,461. In this known system the spectrum of the beat signal for a given object is examined. If this object moves with a certain velocity a frequency shift of the lines of the spectrum occurs as a result of the Doppler effect. The amount of shift furnishes information about the velocity.

It is an object of the present invention to provide a different concept of a system of the above-described type wherein the complicated examination of the beat signal spectrum is obviated. According to the invention the system is characterized in that it further comprises:

means for generating a second high-frequency signal having a time-variable frequency $F_2(t)$ representing a FM-modulated version of a second high-frequency carrier signal having the carrier frequency $F_{02}$;

means for transmitting the second high-frequency signal towards the object;

means for receiving the second high-frequency signal reflected from the object;

means for mixing the received second high-frequency signal for generating a second beat signal whose beat frequency $f_{b2}$ is defined by a second mathematical expression:

$$f_{b2} = 2\frac{H}{c} \frac{dF_2(t)}{dt} \frac{1}{\cos\alpha} - 2\frac{F_{02}}{c} v \sin\alpha$$

wherein $$\frac{dF_2(t)}{dt}$$

represents the variation of the frequency of the second high-frequency signal; an arithmetic unit for determining in an iterative manner from the first and the second mathematical expression that angle $\alpha$ at which one of the two beat frequencies $f_{b1}$ and/or $f_{b2}$ have the lowest value, and for computing the value of H and the value of v by substituting this value of $\alpha$ in the first and the second mathematical expression.

By the use of the measures of the invention, velocity and height can be determined very accurately without the system becoming excessively complicated. Starting from a conventional radio altimeter the information about the velocity can be easily obtained, without the need for much additional equipment.

The invention provides a further advantage in that the aerials used need not be aimed accurately at the object because the object must be seen at a fairly wide angle. Consequently, they do not take up much room.

The invention will be further explained by way of non-limitative example with reference to the accompanying drawings. Herein

Figure 1:
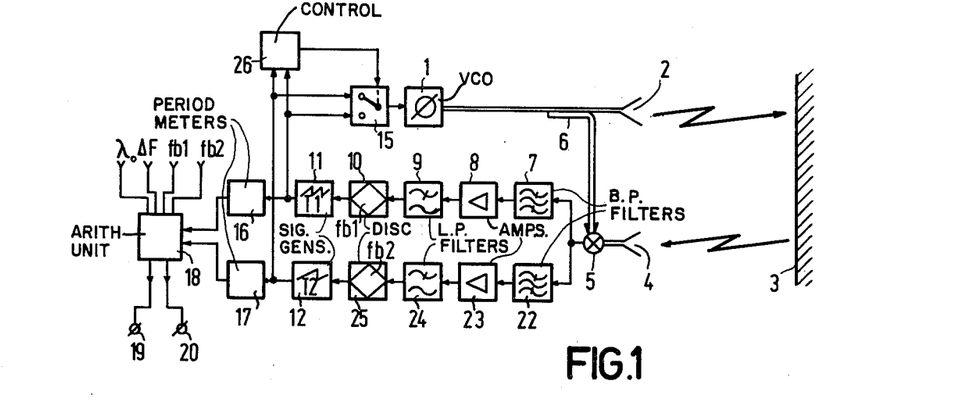
FIG. 1 shows a radar system according to the invention.

The system according to the invention, which is shown in FIG. 1, comprises a radio altimeter of a type described in the French Pat. No. 1,557,670, filed in Applicant's name. More particularly, this radio altimeter comprises a voltage-controlled oscillator 1 producing a first high-frequency signal having a time-variable frequency $F_{1(t)}$ which represents more particularly a linear FM-modulated version of a first high-frequency carrier having a carrier frequency $F_{01}$ of, for example, 4.28 GHz, which corresponds to a wave length $\lambda_{01}$ of 7 cm. The frequency shift of $F_{1(t)}$ will be denoted $\Delta F$ and is, for example, 180 MHz. The first high-frequency signal is transmitted via aerial 2, reflected by obstacle 3 and received by an aerial 4. This received signal is applied together with a portion of the transmitted signal to a mixer stage 5 for generating a beat signal. In order to be able to apply the transmitted signal to the mixer stage 5 a directional coupler 6 is connected to the output of the high-frequency oscillator 1. The beat signal obtained is applied to a frequency discriminator 10 via a bandpass filter 7, whose central frequency has a predetermined value $F_{b1}$, an amplifier 8 and a low-pass filter 9, this frequency discriminator also being tuned to the frequency $F_{b1}$. The output signal of this discriminator 10 is applied as a control signal to a controllable sawtooth signal generator 11 for controlling the slope of the sawtooth signal produced by this generator. As the maximum value of this sawtooth-shaped signal is kept constant, this causes the period of this sawtooth to change. This sawtooth-shaped signal is now applied as a control signal to the oscillator 1 via a switching device 15. The described implementation of the radio altimeter results in the frequency of the beat signal being kept constant at $F_{b1}$, irrespective of the range H to the object 3.

A second bandpass filter 22 having a second central frequency $F_{b2}$ is provided at the output of the mixer stage 5. The beat signal produced by the mixer stage 5 is applied to a second frequency discriminator 25, which is also tuned to $F_{b2}$, via this filter 22, an amplifier 23, and a low-pass filter 24. The output signal of this discriminator 25 is applied to a second controllable sawtooth signal generator 12 to control the slope of the sawtooth-shaped signal produced by this generator 12. Since the maximum value of this sawtooth-shaped signal must be kept constant, the period of the sawtooth changes. In addition, this sawtooth-shaped signa is applied via switching device 15 to oscillator 1 which in response thereto generates a second high-frequency signal having a time-variable frequency $F_{2(t)}$. The shift of $F_{2(t)}$ will also be as taken equal to $\Delta F$.

Figure 2:
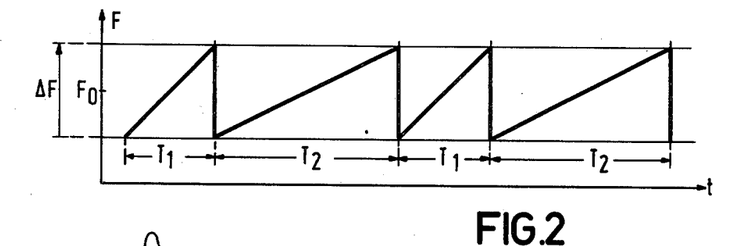
FIG. 2 shows the frequency variation of the transmitted high-frequency signals.

The output signals of the generators are not only applied to the switching device 15 but also to a control device 26 controlling this switching device. This control device 26 ascertains whether the sawtooth signal generator, for example 11, 12, which is connected to the control input of the oscillator 1 produces a signal whose value is greater than the predetermined maximum value. If so, this generator 11 is stopped, so that it no longer produce an output signal, and its output is decoupled from the input of oscillator 1 by means of switching device 15. Simultaneously, generator 12 is started and its output is connected to the input of oscillator 1 by means of the switching device 15. The frequency shift of the transmitted signal is shown in FIG. 2 by way of illustration.

The output signal of generator 11 is further applied to a period meter 16 which produces a digital number which is a measure of the period of the sawtooth-shaped signal produced by the generator 11. In a similar manner the output signal of generator 12 is further applied to a period meter 17 producing a digital number which is a measure of the period of the sawtooth-shaped signal produced by the generator 12.

The numbers thus obtained are applied, together with the values for $\lambda_0$, $\Delta F$, $F_{b1}$ and $F_{b2}$ to an arithmetic unit 18 which determines the range H and the velocity v in an iterative manner by means of these data.

Figure 3:
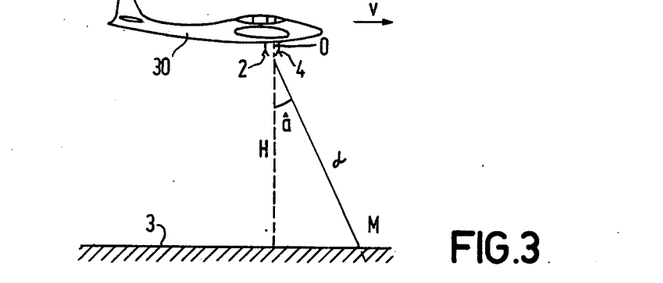
FIG. 3 shows a circuit diagram to explain the operation of the system according to the invention.

In order to further explain how the arithmetic unit 18 can determine the height H above the earth and the velocity v with respect to earth from the data applied to it when this unit is located in an airplane, use is made of FIG. 3. The aerials 2 and 4 are directed to the ground 3, which thus forms the object; the airplane flies at a height H with a velocity "v". A point M on the ground is seen at an angle $\alpha$ from a point O located near the aerials 2 and 4. It will be assumed that this point M is located in a vertical plane through the point O and parallel to the vector representing the velocity "v".

The distance "d" of the point M to the point O is:

$$d = H/\cos \alpha \qquad (1)$$

Figure 4:
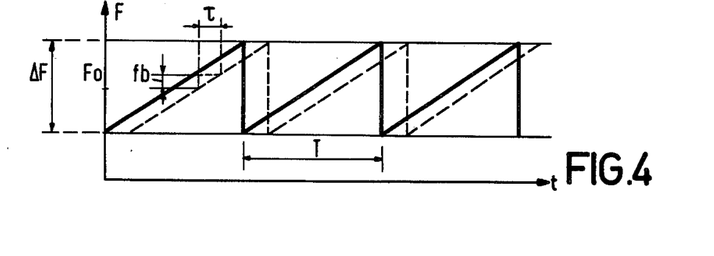
FIG. 4 shows the frequency variation of the transmitted high-frequency signal and the received high-frequency signal.

Let it first be assumed that the first high-frequency signal is transmitted with the frequency $F_{1(t)}$, wherein $F_{01} - \Delta F/2 \leq F_1(t) \leq F_{01} + \Delta F/2$ and that the period of the sawtooth-shaped signal produced by the generator 11 is equal to T. The frequency variation thus obtained for $F_1(t)$ is shown in FIG. 4. The wave reflected from the point M arrives at the receiving aerial 4 with a delay $\tau$, for which it applies that $$\tau = 2d/c = 2H/c.\cos \alpha \qquad (2)$$

In this expression c represents the speed of propagation in free space.

Thus, there is a frequency difference fb' between the transmitted wave and the received wave, it holding for this frequency difference that:

$$fb' = \tau \frac{dF(t)}{dt} = 2 \frac{H}{c} \cdot \frac{dF(t)}{dt} \cdot \frac{1}{\cos \alpha} \qquad (3)$$

However, this expression is only valid when the airplane may be considered as stationary relative to the object 3. The fact the aeroplane moves with a velocity "v", results in a different expression fb', namely as a result of the Doppler effect which must then be taken into consideration. As the velocity of the airplane into the direction OM is equal to $v \sin \alpha$, the actual beat frequency becomes approximately equal to fb, for which it holds that:

$$fb = 2 \frac{H}{c} \cdot \frac{dF(t)}{dt} \cdot \frac{1}{\cos \alpha} - \frac{2v}{\lambda_o} \sin \alpha \qquad (4)$$

wherein $\lambda_o = c/F_o$.

From (4) it follows that a certain value of fb is associated with each value of $\alpha$. The function shown in (4) has a minimum for a certain value of $\alpha$. The value of $\alpha$ corresponding with this minimum will be denoted by $\alpha_0$ and this value follows from the equation:

$$\frac{dfb}{d\alpha} = 0 \qquad (5)$$

or $$\left( \frac{2H \cdot dF(t)}{c \cdot dt} \cdot \frac{\sin \alpha_o}{\cos^2 \alpha_o} \right) - \frac{(2v)}{\lambda_o} \cos \alpha_o = 0 \qquad (6)$$

In the system shown in FIG. 1

$$\frac{dF(t)}{dt} = \frac{\Delta F}{T}$$

$\Delta F$ being constant and T being determined by the period detectors 16 and 17.

In the system shown in FIG. 1 two measurements are performed with different values of F(t)/dt resulting in two different values of T which will be denoted by $T_1$ and $T_2$, respectively, and in two different values for fb which will be denoted by fb1 and fb2, respectively. fb1 and fb2 each satisfy expression (4) and furthermore it will hold for a given value $\alpha_1$ of $\alpha$ that $$\frac{df b1}{d\alpha} = 0$$

and for a given value $\alpha_2$ of $\alpha$ it will hold that $$\frac{df b2}{d\alpha} = 0.$$

The following equations are now available to determine the quantities H and v:

$$fb1 = 2\frac{H}{c} \cdot \left(\frac{\Delta F}{T_1}\right) \cdot \frac{1}{\cos \alpha_1} - 2\frac{v}{\lambda_o} \sin \alpha_1 \quad (7)$$

$$2\frac{H}{c} \cdot \left(\frac{\Delta F}{T_1}\right) \cdot \frac{\sin \alpha_1}{\cos^2 \alpha_1} - \frac{2v}{\lambda_o} \cos \alpha_1 = 0 \quad (8)$$

$$fb2 = 2\frac{H}{c} \cdot \left(\frac{\Delta F}{T_2}\right) \cdot \frac{1}{\cos \alpha_2} - \frac{2v}{\lambda_o} \sin \alpha_2 \quad (9)$$

$$2\frac{H}{c} \cdot \left(\frac{\Delta F}{T_2}\right) \cdot \frac{\sin \alpha_2}{\cos^2 \alpha_2} - \frac{2v}{\lambda_o} \cos \alpha_2 = 0 \quad (10)$$

From (8) and (10) it follows that:

$$\hat{\alpha}_1 = \text{Arc} \cos \frac{\sqrt[3]{3x_1}}{\sqrt{tg\left[2 \text{ Arc } tg \sqrt[3]{tg(\frac{1}{2} \text{ Arc } tg\, x_1)}\right]}} \quad (8a)$$

$$\hat{\alpha}_2 = \text{Arc} \cos \frac{\sqrt[3]{3x_1}}{\sqrt{tg\left[2 \text{ Arc } tg \sqrt[3]{tg(\frac{1}{2} \text{ Arc } tg\, x_2)}\right]}} \quad (10a)$$

wherein $$x_1 = \frac{2 \cdot H \cdot \Delta F \cdot \lambda_o}{\sqrt[3]{3} \cdot c \cdot T_1 \cdot v}$$

$$x_2 = \frac{2 \cdot H \cdot \Delta F \cdot \lambda_o}{\sqrt[3]{3} \cdot c \cdot T_2 \cdot v}$$

or also $$\hat{\alpha}_1 = \text{Arc} \cos \sqrt{\frac{3 \times 1}{2} \cdot \frac{1 - \left(\frac{\sqrt{1+x1^2}-1}{x1}\right)^{\frac{4}{3}}}{\left(\frac{\sqrt{1+1x^2}-1}{x1}\right)^{\frac{2}{3}}}} \quad (8b)$$

$$\hat{\alpha}_2 = \text{Arc} \cos \sqrt{\frac{3 \times 2}{2} \cdot \frac{1 - \left(\frac{\sqrt{1+x2^2}-1}{x2}\right)^{\frac{4}{3}}}{\left(\frac{\sqrt{1+x2^2}-1}{x2}\right)^{\frac{2}{3}}}} \quad (10b)$$

The arithmetic unit 18 comprises a programmed microprocessor which solves the equations (7), (8), (9) and (10) in an interative manner.

The values fb1 and fb2 are known, predetermined quantities and are, for example, equal to 100 kHz and 5 kHz, respectively. More particlarly, it holds for these beat frequencies that they are each greater than or equal to $2v_{max}/\lambda_o$, wherein $v_{max}$ is equal to the maximum permissible velocity of the aircraft.

The iteration process will be started with a first approximation of the value H(1) of H and with a value $\alpha_1 = O$, so that $$H(1) = \frac{cT_1}{2\Delta F} fb_1 \quad (11)$$

Let is now be assumed that $v = O$, it then follows from (9) that the first approximative value $\alpha_2(1)$ of $\alpha_2$ is equal to $$\alpha_2(1) = \text{arc} \cos \left(\frac{fb_1}{fb_2} \cdot \frac{T_1}{T_2}\right) \quad (12)$$

The iterations are performed as follows, starting from these initial values.

First step: determine a first value v(1) of v. by means of expression (9), wherein: $H = H(1)$ and $\alpha_2 = \alpha_2(1)$, so that:

$$v(1) = \frac{\lambda_o}{2 \sin \alpha_2(1)} \left(\frac{2H(1)}{c} \cdot \frac{\Delta F}{T_2} \cdot \frac{1}{\cos \alpha_2(1)} - fb_2\right) \quad (13)$$

Second step: determine a first value $\alpha_1(1)$ of $\alpha_1$ by means of the expression (8a) or (8b) wherein $H = H(1)$ and $v = v(1)$.

Third step: determine a new value H(z) of H by means of expression (7) by substituting therein the value $\alpha_1(1)$ for $\alpha_1$ and by substituting therein the value v(1) for v, so that:

$$H(2) = \frac{c \cdot T1 \cdot \cos \alpha_1(1)}{2\Delta F} \left(\frac{2 \cdot v(1)}{\lambda_o} \sin \alpha_1(1) + fb_1\right)$$

Fourth Step: determine a new value $\alpha_2(2)$ for $\alpha_2$ by means of the expression (10a) or (10b) by substituting in this expression the value H(2) and v(1). The steps 1 to 4 are repeated n times until H(n) and v(n) are equal, with the desired accuracy, to H(n−1) and v(n−1).

Figure 5:
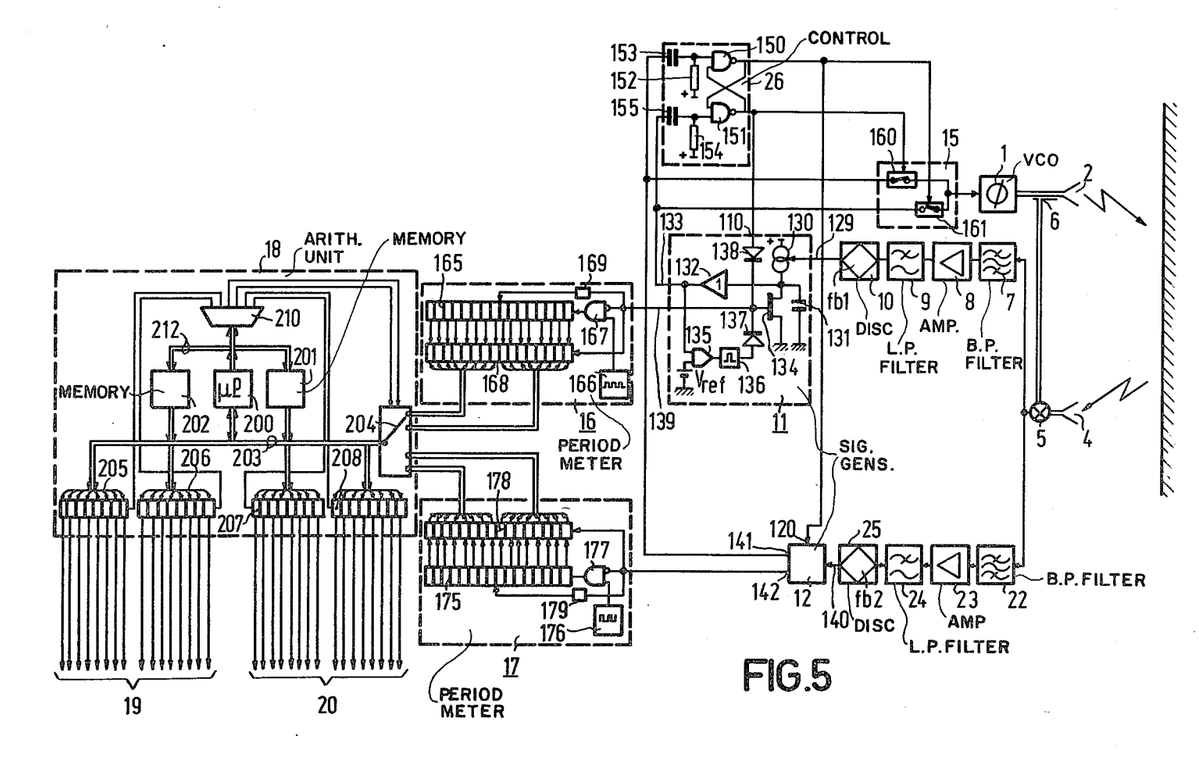
FIG. 5 shows a practical embodiment of the system shown in FIG. 1.

FIG. 5 shows a practical embodiment of the system shown in FIG. 1.

This FIG. 5 shows one of the two generators 11 and 12, which are of an identical construction, notably the generator 11, in greater detail. This generator 11 comprises a voltage-controlled current source circuit 130 to which the output signal of discriminator 10 is applied as control signal via an input 129. The current produced by this current source circuit is applied to a capacitor 131 which can be shortcircuited by a field effect transistor 134. The voltage across capacitor 131 is applied to the output 133 of the generator via a buffer amplifier 132. Whether transistor 134 is conductive or not conductive depends on the control voltage applied thereto. This control voltage comes either from control device 26 or from a comparison device 135. The use of this comparison device, an input of which is connected to the output of the amplifier 132 and to which a reference voltage Vref is applied via the other input, achieves that the sawtooth-shaped voltage varies between O and this voltage Vref. The output of the comparison device 135 is connected to the control input of transistor 134 via a monostable circuit 136 and a diode 137. It should be noted that also the control voltage produced by the control device 26 is applied to the generator 11 via an input 110 and to the control input of transistor 134 via a diode 138. The signal present at the control input of transistor 134 is also applied to the period meter 16 via the output 139.

The inputs 110, 129, 133, 139 of the generator 11 correspond with the inputs 120, 140, 141, 142 of the generator 12.

The control device 26 is constituted by a flipflop of the RS type, consisting of two NAND-gates 150 and 151. The output of the gate 150 is connected to a first input of two inputs of the gate 151 and also to the input 120 of generator 12. The output of the gate 151 is connected to a first input of the gate 150 and also to the input 110 of the generator 11. The other inputs of the gates 150 and 151 are connected to the outputs of differentiating networks which are formed by a resistor 152, 154 and a capacitor 153, 155 respectively. The input of differentiating network 152, 153 is connected to the output 141 of generator 12 and the input of differentiating network 154, 155 is connected to output 133 of generator 11.

The switching device 15 comprises two voltage-controlled switches 160 and 161 consisting of, for example, field effect transistors. The switch 160 connects the control input of oscillator 1 to the output 141 of generator 12; the switch 161 connects this control input to the output 133 of generator 11.

The period meters 16 and 17 are of the digital type and are of an identical construction. The period meter 16 comprises a digital counter 165 for counting the pulses of a clock 166. The output of this clock is connected to the input of this counter 165 via an AND-gate 167, an inverting input of which is connected to output 139 of generator 11. The period meter 16 also comprises a transfer circuit with register 168 which is coupled to the counter 165 and is controlled by the signal occurring at the output 139 of generator 11. This last-mentioned signal is also applied to the reset input of counter 165 via a delay device 169 which has a time delay $\tau$.

The elements 165 to 169, inclusive, of the period meter 16 correspond with the elements 175 to 179, inclusive, of the period meter 17. The inverting input of gate 177 is now connected to the output 142 of generator 12.

Figure 6:
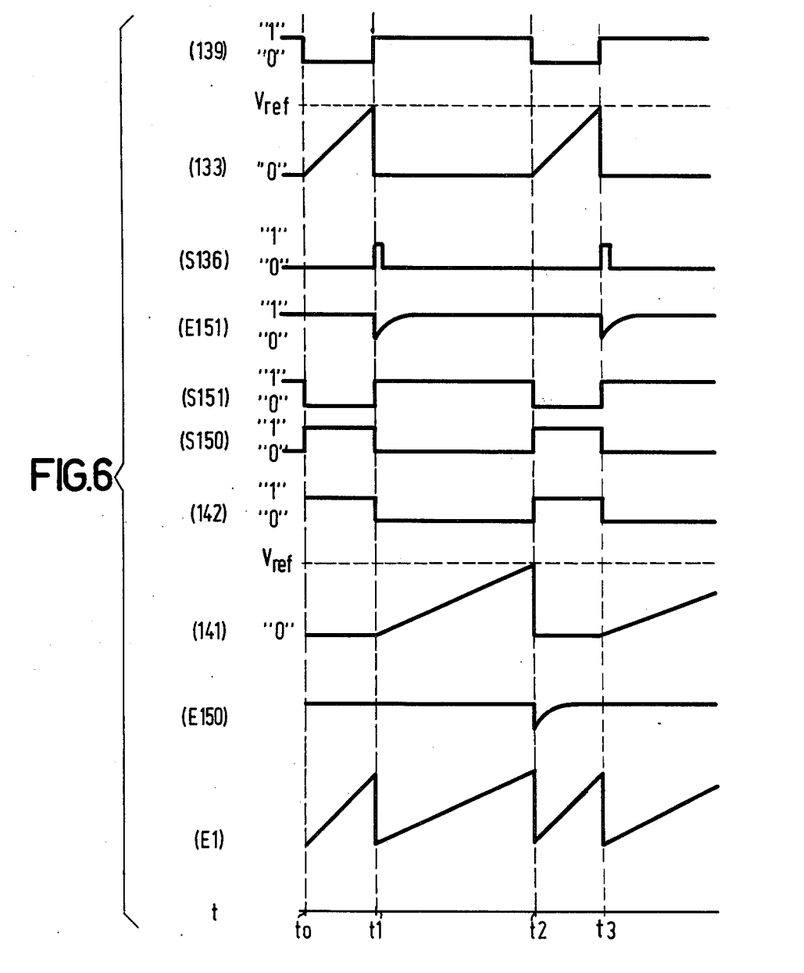
FIG. 6 shows some time diagrams to explain the system of FIG. 5.

The operation of the system shown in FIG. 5 will now be further explained with reference to FIG. 6, which shows some time diagrams of different signals present in this system. The lines denoted by 139, 133, 142 and 141 indicate the shape of the signals at the outputs 139, 133, 142, 141, respectively, of the generators 11 and 12. The line (S 136) represents the signal at the output of the monostable circuit 136.

The line (E 151) represents the signal at the input of the gate 151.

The line (S 151) represents the signal at the output of the gate 151.

The line (S 150) represents the signal at the output of the gate 150.

The line (E 150) represents the signal at the input of the gate 150.

The line (E 1) represents the signal at the central input of oscillator 1.

The line "t" represents the time.

At the instant $t_0$, the sawtooth signal produced by the generator 11 starts. When at the instant $t_1$ this signal reaches the value Vref the comparison device 135 produces a signal which changes from the value "0" to the value "138". At this signal transition the monostable circuit 136 produces a pulse which is represented by the line S 136. This pulse renders the transistor 134 conductive. The capacitor 131 is then discharged and the voltage at the output 133 changes to 0 Volt. The differentiating network formed by the resistor 154 and the capacitor 155 produces a pulse represented by the line E 151. This pulse causes the state of the flipflop 150, 151 to change so that there appears at the output of the gate 151 a signal whose logic value is "1" and a signal "0" at the output of the gate 150. As the control input of transistor 134 is connected to the output of the gate 151 the transistor 134 remains conductive. The output signal of the generator 11 continues to have the value 0 Volt. As the signal at the output of the gate 150 has the value "0" the generator 12 then produces its sawtooth signal from 0 Volt; this signal is applied to the control input of oscillator 1, as switch 160 is rendered conductive by the logic signal of the value "1" present at the output of the gate 151.

When at the instant $t_2$ the signal at the output 141 of the generator 12 has reached the value $V_{ref}$ it changes to 0 Volt. This sudden voltage drop is detected by the differentiating network 152, 153 so that the flip-flop 150, 151 changes state again. This new state restarts generator 11 and stops generator 12. Thus, the control voltage coming from generator 11 is applied to the oscillator 1 as switch 161 is in the conductive state and switch 162 in the non-conductive state. The above-described process is then repeated.

When the signal at the outputs 139 and 142, respectively, assumes the value "0", that is to say the relevant generator produces its sawtooth-shaped signal, pulses of clock generator 166 and 176, respectively, are applied to counter 165 and 175, respectively. When the signal at the outputs 139 and 142, respectively, changes to the value "1" the content of the counter 165 and 175, respectively, is first applied to the arithmetic circuit 18 via the transfer circuit 168 and 178, respectively, whereafter the counter 165 and 175, respectively, are reset to zero.

The arithmetic circuit 18 is constituted by a microprocessor 200, for example the microprocessor MC 6802, produced by MOTOROLA. Two memories or stores 201 and 202 are connected to this microprocessor, one store being intended to receive the working program and the second store containing different tabulated values: on the one hand the different trigonometrical functions and, on the other hand, the relations 8a and 10a, which reduces the computation time.

The microprocessor comprises a common data bus having eight wires which, in order to receive the information from the period meters 16 and 17 is connected to multiplex device 204, which is shown in the Figure as a four-position switch. Since the data bus 203 has eight wires and the registers 168 and 178 have 16 positions in this embodiment these registers are read in two cycles. Also the numbers which are representative of range and velocity are produced in sixteen bits and become available at the outputs 19 and 20 which are each connected to two eight-bit registers 205, 206 and 207, 208, respectively. The control inputs of these registers 205 to 208, inclusive, for writing and reading information, as well as the multiplex device 204 are connected to the outputs of a decoding device 210 the input of which is connected to the common address line 212 of the microprocessor 200, this line also being connected to the address inputs of the stores 200 and 201.

Figure 7:
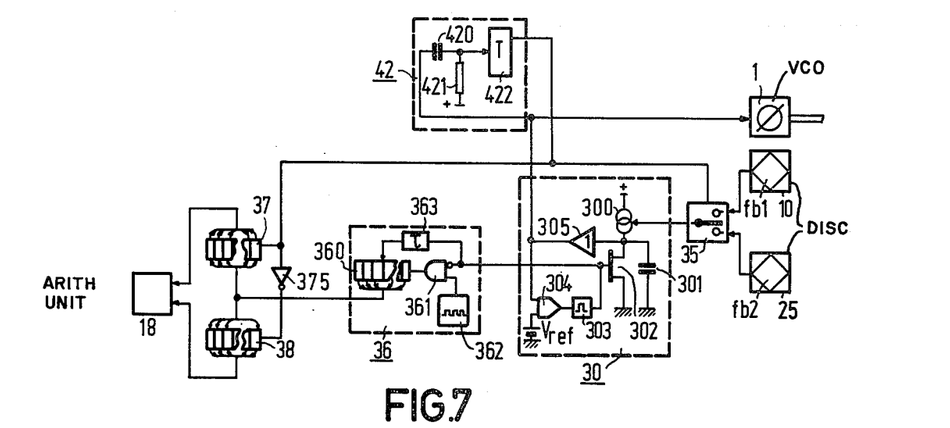
FIG. 7 shows a first variant of the system according to the invention.

FIG. 7 shows a variant of the system shown in FIG. 1. In this Figure, the elements in common with those of FIG. 1, are given the same reference numerals. The system shown in this FIGURE comprises one single sawtooth signal generator 30 the slope of whose output signal is controlled by either the signal coming from the discriminator 10, or by the signal coming from the discriminator 25. Each output of these discriminators 10 and 25 is connected to the control input of the generator 30 via a switching circuit 35.

A period meter 36 measures the duration of the different sawtooths. The duration of the sawtooth generated by generator 30 when this generator is controlled by the output signal of discriminator 10 is stored in a register 37 so that it is available for processing in the arithmetic circuit 18.

The duration of the sawtooth generated by generator 30 when this generator is controlled by the output signal of discriminator 25 is stored in a register 38. A control circuit 42 which detects the ends of the sawtooths serves to control the switching circuit 35 and the registers 37 and 38.

The sawtooth generator 30, and likewise the generator 11 shown in detail in FIG. 5, comprises a voltage-controlled current source 300, a capacitor 301, and a field effect transistor 302 for short-circuiting this transistor when the monostable circuit 303 produces an output pulse. This circuit 303 is controlled by the comparison circuit 304 to which the voltage across the capacitor 301 as well as a reference voltage is applied via a buffer amplifier 305.

The voltage at the control input of transistor 302 controls the period meter 36. This period meter is predominantly comprised of a counter 360, whose counting input is connected to the output of a NAND-gate 361, an input of which is connected to the output of a clock pulse generator 362; a delay element 363 again introduces a delay $\tau$ which is less than the duration of the pulse produced by the monostable circuit 303. The control input of register 37 is directly connected to the output of the control circuit 42, the control input of register 38 being connected to control circuit 42 via an inverter 375. The inputs of the registers 37 and 38 are connected to the outputs of the counter 360.

The control circuit 42 is comprised of a differentiating network formed by a capacitor 420 and a resistor 421, the input of this differentiating network being connected to the output of the generator 30, that is to say to the output of the amplifier 305, the output being connected to the input of a flipflop 422 of the type T, whose output constitutes the output of this device 42. Flipflop 422 changes state at each transition of the signal applied thereto.

The arrangement shown in FIG. 7 operates in the same manner as the arrangement shown in the FIGS. 1 and 5. Let is first be assumed that the signal at the output of the flipflop 422 has the logic value "1" so that the input of the sawtooth generator 30 is connected to the output of the discriminator 10 via switching circuit 35. As soon as the value of the sawtooth signal reaches the value Vref this is detected by the comparison device 304 whose output signal then switches off the monostable circuit 303. In the first place this output signal renders transistor 302 conductive, the output signal of the generator then assuming the value 0, and in the second place it blocks counter 360. The fact that the sawtooth rapidly changes from the value Vref to the value zero is detected by the differentiating network 420, 421 so that the flipflop 422 changes state, the output signal has the value "0"; in response to this change in the state of the flipflop 42 the content of counter 360 is entered in the register 37 and the switching device 35 changes position. The delay element 363 applies the signal, produced by the monostable circuit 303 with a time delay to the reset input of counter 360. If thereafter the output signal of the monostable circuit 303 becomes equal to "0" a new sawtooth is then started whose slope depends on the signal produced by the discriminator 25. The gate 351 is open and the period of this sawtooth is measured. Once this value has been measured the data representing this value will be stored in the register 38.

Figure 8:
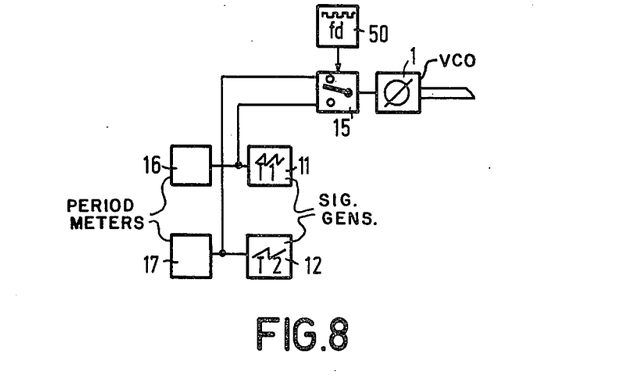
FIG. 8 shows a second variant of the system according to the invention.
Figure 9:
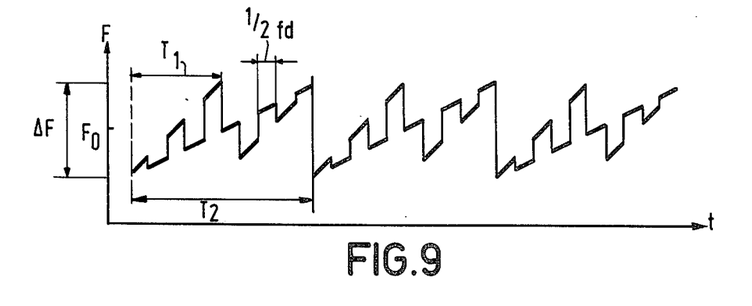
FIG. 9 shows a time diagram to explain the operation of the system shown in FIG. 8.

A further variant of the arrangement shown in FIG. 1 is shown in FIG. 8; in this Figure the elements which correspond to those in FIG. 1 are given the same reference numerals. In this embodiment the switching circuit 15 is controlled by a free-running clockpulse generator 50. The frequency of the clock pulse signal generated thereby is assumed to be considerably higher than that of the sawtooth signals so that the control input of oscillator 1 receives alternately with a high speed the output signals of the generators 11 and 12. The variation of the frequency of the output signal of the oscillator 1 obtained thereby is shown in FIG. 9.

Although a radar system has been described in which the frequency $\Delta F$ functions as a constant, and the period T varies, it is alternatively possible to use a radar system in which T is the constant and $\Delta F$ varies.

I claim:

1. In a system for determining the range H to an object and the relative velocity v of the object, the combination comprising means for generating a first and second high-frequency signal, said first high-frequency signal having a time-variable frequency which represents an FM-modulated version of a first high-frequency carrier signal and said second high-frequency signal having a time-variable frequency which represents an FM-modulated version of a second high-frequency carrier signal; means for transmitting said first high-frequency signal towards said object; means for receiving said first high-frequency signal reflected from the object; means for mixing the received first high-frequency signal with the first high-frequency signal to be transmitted for generating a first beat signal having a first mathematical expression wherein $\alpha$ represents the angle at which a point of the object is seen; said means for transmitting also transmitting said second high-frequency signal towards the object; said means for receiving also receiving said second high-frequency signal reflected from the object; said means for mixing also mixing the received second high-frequency signal with the second high-frequency signal to be transmitted for generating a second beat signal of frequency which is defined by a second mathematical expression including said angle $\alpha$; and an arithmetic unit for iteratively determining the angle $\alpha$, from the first and the second mathematical expression, at which one of the two beat frequencies has the lowest value, and for computing the value of H and the value of v by substituting this value of $\alpha$ in the first and the second mathematical expression.

2. In a system for determining the range H to an object and the relative velocity v of the object, the combination comprising means for generating a first and second high-frequency signal, said first high-frequency signal having a time-variable frequency $F_1(t)$ which represents a FM-modulated version of a first high-frequency carrier signal having the carrier frequency $F_{01}$ and said second high-frequency signal having a time-variable frequency $F_2(t)$ which represents a FM-modulated version of a second high-frequency carrier signal having the carrier frequency $F_{02}$; means for transmitting said first high-frequency signal towards said object; means for receiving said first high-frequency signal reflected from the object; means for mixing the received first high-frequency signal with the first high-frequency signal to be transmitted for generating a first beat signal whose first beat frequency $f_{b1}$ being defined by a first mathematical expression $$f_{b1} = 2\frac{H}{c} \frac{dF_1(t)}{dt} \frac{1}{\cos \alpha} - 2\frac{F_{01}}{c} v \sin\alpha$$

wherein c represents the velocity of the light, $$\frac{dF_1(t)}{dt}$$

represents the variation in the frequency of the first high-frequency signal and $\alpha$ represents the angle at which a point of the object is seen; said means for transmitting also transmitting said second high-frequency signal towards the object; said means for receiving also receiving said second high-frequency signal deflected from the object; said means for mixing also mixing the received second high-frequency signal with the second high-frequency signal to be transmitted for generating a second beat signal of frequency $f_{b2}$ which is defined by a second mathematical expression:

$$f_{b2} = 2\frac{H}{c} \frac{dF_2(t)}{dt} \frac{1}{\cos \alpha} - 2\frac{F_{02}}{c} v \sin\alpha$$

wherein $$\frac{dF_2(t)}{dt}$$

represents the variation of the frequency of the second high-frequency signal; and an arithmetic unit for iteratively determining the angle $\alpha$, from the first and the second mathematical expression, at which one of the two beat frequencies $f_{b1}$ and/or $f_{b2}$ has the lowest value, and for computing the value of H and the value of v by substituting this value of $\alpha$ in the first and the second mathematical expression.

3. The system of claim 2 further comprising a first signal generator, a second signal generator and a control circuit, said control circuit responsive to said signal generators for switching between first and second stable states, a switchable circuit responsive to said control circuit for switching between two conditions, the first condition applying a signal from one of said signal generators to an oscillator for transmission of said first high-frequency signal and the second condition applying a signal from the other of said signal generators to said oscillator for transmission of said second high-frequency signal.

4. The system of claim 2 wherein said system further includes means for digitizing the successive respective signal periods and said arithmetic unit includes a plurality of storage registers for receiving successive digitized data and a microprocessor for processing each set of digitized data to determine H and v.

5. A method of determining the range and relative velocity of an object comprising the steps of transmitting first and second high-frequency signals, receiving the reflections of said first and second high-frequency signals, mixing, respectively, (a) the reflected first high-frequency signal with the transmitted firsst high-frequency signal to obtain a first beat signal and (b) the reflected second high-frequency signal with the transmitted second high-frequency signal to obtain a second beat signal, and determining, from a predetermined mathematical relationship for which one of said beat frequencies has the lowest value, the values of H and v.

* * * * *